United States Patent
Yamada

(10) Patent No.: US 10,571,333 B2
(45) Date of Patent: Feb. 25, 2020

(54) COLORIMETRIC DEVICE

(71) Applicant: KONICA MINOLTA, INC., Chiyoda-ku (JP)

(72) Inventor: Masayuki Yamada, Toyonaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/781,965

(22) PCT Filed: Dec. 5, 2016

(86) PCT No.: PCT/JP2016/086033
§ 371 (c)(1),
(2) Date: Jun. 6, 2018

(87) PCT Pub. No.: WO2017/099032
PCT Pub. Date: Jun. 15, 2017

(65) Prior Publication Data
US 2018/0356285 A1     Dec. 13, 2018

(30) Foreign Application Priority Data

Dec. 10, 2015  (JP) ................. 2015-240993

(51) Int. Cl.
*G01J 3/02*     (2006.01)
*G01J 3/51*     (2006.01)

(52) U.S. Cl.
CPC ........... *G01J 3/0251* (2013.01); *G01J 3/021* (2013.01); *G01J 3/0208* (2013.01);
(Continued)

(58) Field of Classification Search
CPC ...... G01J 3/0251; G01J 3/0262; G01J 3/0208; G01J 3/0264; G01J 3/021; G01J 3/0291; G01J 3/0235; G01J 3/51
See application file for complete search history.

(56) References Cited

U.S. PATENT DOCUMENTS 5,258,363 A * 11/1993 Hed ............. G01J 1/04
                                              250/228
7,256,390 B1 * 8/2007 Cutlip ............ G01J 1/04
                                              250/228
(Continued)

FOREIGN PATENT DOCUMENTS

JP     64-86028     3/1989
JP     5-172632    7/1993
(Continued)

OTHER PUBLICATIONS

Written Submission of Publications dated Dec. 3, 2019 issued in Japanese Patent Application No. 2017-555053.
(Continued)

*Primary Examiner* — Hina F Ayub
(74) *Attorney, Agent, or Firm* — Cozen O'Connor

(57) ABSTRACT

A colorimeter includes an integrating sphere, a light source, a light receiver and a low reflectance unit. The integrating sphere has a first aperture to be covered with a sample and a second aperture opposing the first aperture configured to allow reflected light from the sample to pass therethrough. The light source irradiates an inner wall of the integrating sphere with light. The light receiver receives, through the second aperture, the reflected light from a surface of the sample that enters the integrating sphere through the first aperture when the light from the light source is reflected by the inner wall, and is applied to the sample through the first aperture, and outputs a signal in accordance with the reflected light. The low reflectance unit is disposed around the light receiver to face an internal space of the integrating sphere, and has lower light reflectance than the inner wall.

7 Claims, 6 Drawing Sheets

(52) U.S. Cl.
CPC ........... *G01J 3/0235* (2013.01); *G01J 3/0262* (2013.01); *G01J 3/0264* (2013.01); *G01J 3/0291* (2013.01); *G01J 3/51* (2013.01)

(56) References Cited

U.S. PATENT DOCUMENTS

| | | | |
|---|---|---|---|
| 2003/0227627 A1* | 12/2003 | Imura | G01J 3/0251 356/407 |
| 2014/0218735 A1* | 8/2014 | Tatsuda | G01J 3/2823 356/416 |

FOREIGN PATENT DOCUMENTS

| | | |
|---|---|---|
| JP | 9-119887 | 5/1997 |
| JP | 9-264781 | 10/1997 |
| JP | 11-72388 | 3/1999 |
| JP | 2005-062095 | 3/2005 |
| JP | 2010-261847 | 11/2010 |

OTHER PUBLICATIONS

JIS P 8152 2005: "Paper, Paperboard, and Pulp-Method of Measuring Diffuse Reflectance", Nov. 12, 2001 (4 pages).

\* cited by examiner

COLORIMETRIC DEVICE

RELATED APPLICATIONS

This is a U.S. National Phase Application under 35 USC 371 of International Application PCT/JP2016/086033 filed on Dec. 5, 2016.

This application claims the priority of Japanese application no. 2015-240993 filed Dec. 10, 2015, the entire content of which is hereby incorporated by reference.

TECHNICAL FIELD

The present invention relates to a colorimetric device.

BACKGROUND ART

There is a colorimetric device that illuminates, using an integrating sphere, a sample disposed at an aperture portion of the integrating sphere as a target of colorimetry, receives reflected light from the sample, and measures a surface color (specifically, an object color) of the sample (e.g., Japanese Patent Application Laid-Open No. 2005-62095).

In this colorimetric device, the size of an aperture for measurement (also referred to as a measurement aperture) of the integrating sphere is determined appropriately in accordance with the type, the size, and the like of the sample. Measurement (average value measurement and spot measurement) is made using a portion of the sample disposed to face the measurement aperture as an area (also referred to as a measured area) as a planar target of measurement. In a portable or handheld colorimetric device, the diameter of the measurement aperture is usually set to approximately 3 mm to 20 mm in accordance with the size of the integrating sphere. This is because the diameter of the measurement aperture is set, relative to the diameter of the integrating sphere, within a range in which measurement of the object color is less likely to be affected.

If two-dimensional distribution of a color in a measured area having a predetermined size can be measured in the colorimetric device, color irregularity and a complicated shape, such as a pattern, in the measured area can be measured through selection of the measured area, simultaneous measurement at a plurality of separate locations and measurement in an elongated area, and the like. Such measurement cannot be achieved in a case where an average value of colors in a circular measured area on the surface of a sample disposed at a circular measurement aperture is measured, as in a conventional colorimetric device.

PRIOR ART DOCUMENT

Patent Document

SUMMARY

The colorimetric device that can measure the two-dimensional distribution of the color is not limited to a large one to be placed on a desk and the like, and includes a portable one that is compact and lightweight and can be held in the hand. Use of a light receiving system including a combination of an imaging element and an imaging lens is considered to measure the two-dimensional distribution of the color on the surface of the sample.

In a case where the integrating sphere is used to perform light irradiation in a diffuse illumination scheme suitable for colorimetry, however, the integrating sphere has an aperture portion for receiving light (also referred to as a light receiving aperture portion) not to block a ray to be received by the light receiving system. In addition, to reduce an error in colorimetry caused by specularly reflected light that can be produced by a gloss on the surface, the sample is measured under specular component excluded (SCE) conditions on which the specularly reflected light is excluded, for example, by providing a light trap to the integrating sphere. Furthermore, the measurement aperture is provided to face the sample, as described above. The integrating sphere thus has a plurality of large apertures, which reduce the function of the integrating sphere for achieving diffuse illumination.

Such a problem becomes serious as the diameter of the measurement aperture facing the sample increases relative to the size of the integrating sphere. However, an increase in size and weight of the integrating sphere is inappropriate to achieve the size and the weight suitable for the portable colorimetric device. The diameter of the measurement aperture facing the sample thus has to increase relative to the size of the integrating sphere. On the other hand, the specular component excluded (SCE) conditions become incomplete when the light trap is excessively small relative to the measurement aperture. It is thus not easy to maintain the accuracy of color measurement on the surface of the sample.

The present invention has been conceived in view of the above-mentioned problem, and an object thereof is to provide a compact colorimetric device that can measure a color on the surface of a sample with high accuracy.

Means to Solve the Problem

To solve at least one of the above-mentioned problems, a colorimetric device according to a first aspect includes an integrating sphere, a light source unit, a light receiving unit, and a low reflectance unit. The integrating sphere has a first aperture portion and a second aperture portion. The first aperture portion forms an aperture for measurement at which a sample is disposed to cover the aperture for measurement. The second aperture portion opposes the first aperture portion, and forms an aperture for receiving light configured to allow reflected light from the sample to pass therethrough. The light source unit irradiates an inner wall surface of the integrating sphere with light. The light receiving unit receives, through the aperture for receiving light, the reflected light from a two-dimensional area on a surface of the sample that enters the integrating sphere through the aperture for measurement when the light from the light source unit is reflected by the inner wall surface, and is applied to the two-dimensional area through the aperture for measurement, and includes an optical system and a detecting unit configured to output a signal in accordance with the reflected light guided by the optical system. The low reflectance unit is disposed in an area around the light receiving unit to face an internal space of the integrating sphere, and has lower light reflectance than the inner wall surface of the integrating sphere. An outside diameter of the low reflectance unit in plan view of the low reflectance unit from the aperture for measurement is equal to or greater than a diameter of the aperture for measurement in plan view of the aperture for measurement from the aperture for receiving light.

DESCRIPTION OF EMBODIMENTS

Figure 1:
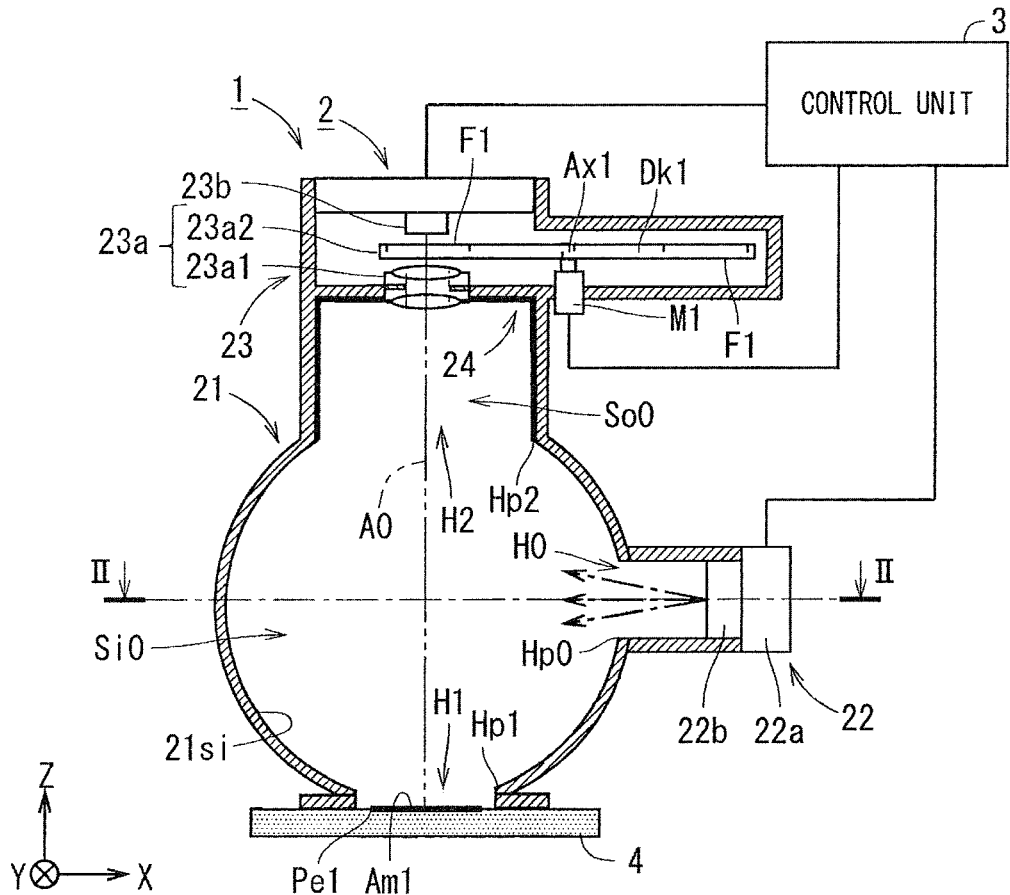
FIG. 1 illustrates schematic configuration of a colorimetric device according to an embodiment.

An embodiment and various modifications will be described below based on the drawings. Portions having similar structures and functions bear the same reference sign in the drawings, and description thereof will not be repeated below. The drawings are schematically shown, and the sizes of various structures, the positional relationship between them, and the like in each of the drawings can be changed appropriately. FIGS. 1 to 3 and 5 to 9 are accompanied by right-handed XYZ coordinate systems with upward directions of colorimetric devices 1, 1A, and 1B (upward directions in FIGS. 1, 6, 8, and 9) being +Z directions.

(1) Embodiment (1-1) Outline of Colorimetric Device

Figure 2:
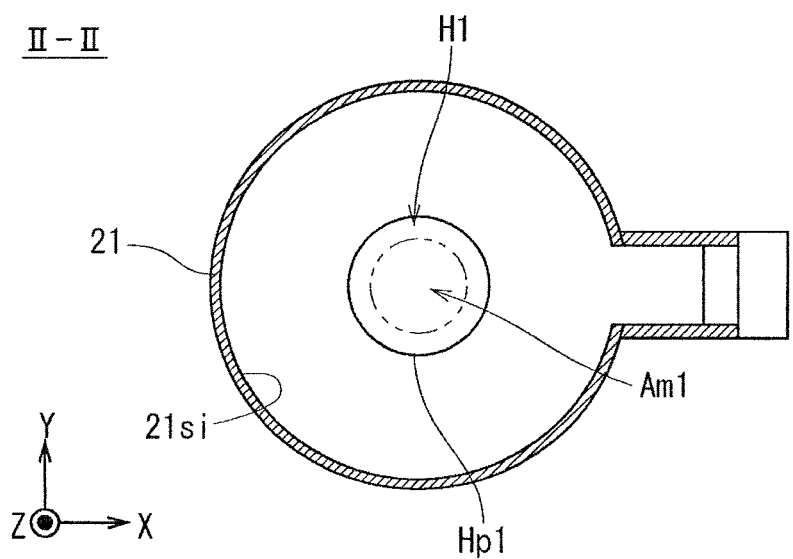
FIG. 2 illustrates the bottom of an integrating sphere as viewed from the inside thereof.

FIG. 1 illustrates schematic configuration of the colorimetric device 1 according to an embodiment. FIG. 2 illustrates the bottom of an integrating sphere 21 as viewed from the inside thereof. Specifically, FIG. 2 shows an XY cross section taken along an alternate long and short dash line II-II of FIG. 1.

The colorimetric device 1 is a device for measuring a color of the surface (also referred to as a surface color) of a sample 4 as a measured object. The surface color herein includes an object color, for example. Measurement of the surface color can include, for example, acquisition of a numerical value directly indicating the surface color and acquisition of a numerical value from which the surface color can be derived.

The colorimetric device 1 includes a colorimetric unit 2 and a control unit 3. The colorimetric unit 2 and the control unit 3 may integrally be formed herein to form the colorimetric device 1, or may separately be formed herein to form the colorimetric device 1, for example.

In a case where the colorimetric unit 2 and the control unit 3 are separately formed, the control unit 3 can be formed, for example, by a personal computer and the like. In this case, the colorimetric unit 2 and the control unit 3 are connected to be able to perform wired or wireless data communication, for example.

(1-2) Colorimetric Unit

The colorimetric unit 2 includes the integrating sphere 21, an illuminating unit 22, a light receiving unit 23, and a low reflectance unit 24.

The integrating sphere 21 is a spherical member having an inner wall surface 21si that diffusely (irregularly) reflects light almost completely. The inner wall surface 21si can herein be formed, for example, by applying white paint, such as barium sulfate, to an inner surface of the spherical member. The integrating sphere 21 has aperture portions Hp0, Hp1, and Hp2 forming three respective apertures H0, H1, and H2.

Approximately circular apertures can be used as the apertures H0, H1, and H2, for example.

The aperture portion Hp0 is a portion forming the aperture H0 for irradiating the inner wall surface 21si of the integrating sphere 21 with light from the illuminating unit 22.

The aperture portion Hp1 is a portion (also referred to as a first aperture portion) forming the aperture H1 for measurement at which the sample 4 is disposed to cover the aperture H1 for measurement. In the present embodiment, the first aperture portion Hp1 is provided at the bottom of the integrating sphere 21.

The aperture portion Hp2 is a portion (also referred to as a second aperture portion) opposing the first aperture portion Hp1 and forming the aperture H2 for receiving light configured to allow reflected light from the sample 4 to pass therethrough.

The illuminating unit 22 can irradiate the sample 4 with light to measure the surface color of the sample 4. The illuminating unit 22 includes a light-emitting circuit 22a and a light source unit 22b.

The light-emitting circuit 22a is a circuit for causing the light source unit 22b to emit light. The light source unit 22b can irradiate the inner wall surface 21si of the integrating sphere 21 with light.

As the light source unit 22b, a halogen lamp, a xenon lamp, a light-emitting diode (LED), or the like that emits light of a predetermined color, such as white light, can be used, for example.

In the present embodiment, light emitted from the light source unit 22b enters the integrating sphere 21 through the aperture H0, and is applied to the inner wall surface 21si of the integrating sphere 21. The light applied to the inner wall surface 21si is herein applied, through the aperture H1, to the sample 4 disposed to cover the aperture H1, for example, after being irregularly reflected by the inner wall surface 21si one or more times. The light source unit 22b may be disposed inside the integrating sphere 21 without providing the aperture H0 and the aperture portion Hp0, for example.

The light receiving unit 23 is a portion for receiving light from the sample 4. Specifically, light from the light source unit 22b is reflected by the inner wall surface 21si, and is applied, through the aperture H1 for measurement, to an area (also referred to as a two-dimensional area) Am1 as a target of measurement on the surface of the sample 4. In this case, the light receiving unit 23 can receive, through the aperture H2 for receiving light, reflected light from the two-dimensional area Am1 entering the integrating sphere 21 through the aperture H1 for measurement. The light receiving unit 23 includes an optical system 23a and a detecting unit 23b, for example.

The optical system 23a can guide reflected light from the sample 4 to the detecting unit 23b to cause the detecting unit 23b to image the reflected light, for example. The optical system 23a includes a lens unit 23a1 and a filter unit 23a2, for example.

The lens unit 23a1 can appropriately refract the reflected light from the sample 4 to focus the reflected light towards the detecting unit 23b. In FIG. 1, an optical axis A0 of the lens unit 23a1 is indicated by a thin alternate long and two short dashes line. In the present embodiment, the optical axis A0 of the lens unit 23a1 passes through the centers of the aperture H1 and the aperture H2, for example. The sample 4 is disposed to cover the aperture H1 so that a normal to the surface of the sample 4 is approximately parallel to the optical axis A0, for example.

The filter unit 23a2 can selectively allow light in a predetermined wavelength range set in advance to pass therethrough. The filter unit 23a2 includes three or more filters for allowing light in three or more different wavelength ranges to pass therethrough, for example. The filter unit 23a2 can selectively allow light in a desired wavelength range to pass therethrough by appropriately switching a filter disposed on an optical path from the lens unit 23a1 to the detecting unit 23b.

Figure 3:
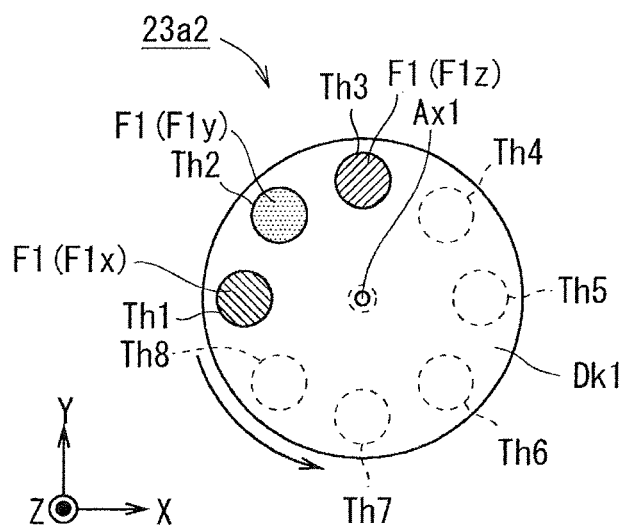
FIG. 3 is a plan view showing an example of the configuration of a rotary filter unit.

FIG. 3 is a plan view showing an example of the configuration of the filter unit 23a2. The filter unit 23a2 shown in FIG. 3 is rotary. Specifically, the filter unit 23a2 includes a circular disk Dk1 on a virtual plane (on an XY plane in FIG. 3) orthogonal to the optical axis A0 of the lens unit 23a1, a rotational axis Ax1, filter portions F1 and a motor portion M1 (FIG. 1), for example.

The disk Dk1 has a plurality of through holes Th1, Th2, Th3, Th4, Th5, Th6, Th7, and Th8 in a circumferential direction along an outside edge, for example. The plurality of through holes Th1, Th2, Th3, Th4, Th5, Th6, Th7, and Th8 are provided at 45° intervals around the rotational axis Ax1 provided at the center of the disk Dk1 and extending along a Z axis.

Three or more (three in the present embodiment) filter portions F1 set in advance have herein been attached to a plurality of through holes set in advance (e.g., three through holes Th1, Th2, and Th3) of the plurality of through holes Th1, Th2, Th3, Th4, Th5, Th6, Th7, and Th8, for example. FIG. 3 shows an example in which a filter portion F1x for allowing light in a wavelength range of X of an XYZ colorimetric system to pass therethrough has been attached to the through hole Th1, a filter portion F1y for allowing light in a wavelength range of Y of the XYZ colorimetric system to pass therethrough has been attached to the through hole Th2, and a filter portion F1z for allowing light in a wavelength range of Z of the XYZ colorimetric system to pass therethrough has been attached to the through hole Th3.

As the three or more filter portions F1, filter portions relating to other three colors, such as filter portions for red (R), green (G), and blue (B) and filter portions for cyan (C), magenta (M), and yellow (Y), may be used in place of the three filter portions F1x, F1y, and F1z.

The disk Dk1 is rotated about the rotational axis Ax1 by the motor portion M1 to switch the type of a filter portion F1 disposed between the lens unit 23a1 and the detecting unit 23b, for example. For example, the filter unit 23a2 shown in FIG. 3 can switch the filter portion F1 from the filter portion F1x to the filter portion F1y and then to the filter portion F1z by rotating the disk Dk1 45° counterclockwise about the rotational axis Ax1.

The detecting unit 23b outputs a signal in accordance with intensity of light entering through the filter unit 23a2. That is to say, the detecting unit 23b outputs the signal in accordance with the reflected light guided by the optical system 23a. The detecting unit 23b includes a plurality of photoelectric conversion elements arranged two-dimensionally, for example. The plurality of photoelectric conversion elements are herein arranged in a matrix, for example, to constitute an area sensor, such as a CCD. In the present embodiment, the wavelength range of light received by the detecting unit 23b is adjusted by the filter unit 23a2, and thus the detecting unit 23b is formed, for example, by a monochrome area sensor and the like.

With the detecting unit 23b having such configuration, the reflected light from the two-dimensional area Am1 as the target of measurement on the surface of the sample 4 entering the integrating sphere 21 through the aperture H1 is received through the second aperture portion Hp2. In this case, the filter unit 23a2 sequentially switches the filter portion F1, so that the detecting unit 23b outputs the signal in accordance with light in a corresponding one of the three or more different wavelength ranges. In the present embodiment, outputs of the detecting unit 23b of the signals in accordance with lights in respective one of the three or more different wavelength ranges include outputs of the signals corresponding to tristimulus values X, Y, and Z, and thus the signals corresponding to color matching functions can easily be acquired.

The two-dimensional area Am1 is herein set not to include an area, on the surface of the sample 4, close to an outside edge of the aperture H1, for example. The signal can thus be acquired in accordance with the reflected light from the two-dimensional area Am1 having reduced effects of a shadow, reduction in amount of applied light, and the like that can be caused on the surface of the sample 4 by an edge portion of the first aperture portion Hp1. The two-dimensional area Am1 is indicated by a thick line in FIG. 1, and an outside edge of the two-dimensional area Am1 is indicated by a thin alternate long and two short dashes line in FIG. 2. For example, a case where the diameter of the aperture H1 for measurement is set to 40 mm, and the diameter of the two-dimensional area Am1 is set to 35 mm when an inside diameter of the integrating sphere 21 is 100 mm is considered.

The low reflectance unit 24 is disposed around the light receiving unit 23 to face an internal space Si0 of the integrating sphere 21. That is to say, the low reflectance unit 24 opposes the internal space Si0 of the integrating sphere. The low reflectance unit 24 has lower light reflectance than the inner wall surface 21si of the integrating sphere 21. Due to the presence of the low reflectance unit 24 having such configuration, specularly reflected light directed from the two-dimensional area Am1 to the light receiving unit 23 is less likely to be produced. That is to say, a component of the specularly reflected light produced in the two-dimensional area Am1 of light entering the detecting unit 23b from the two-dimensional area Am1 through the optical system 23a can be reduced.

The low reflectance unit 24 can be formed by a black portion, for example. As described above, if configuration in which the low reflectance unit 24 includes the black portion is used, for example, the low reflectance unit 24 can easily be formed. Light reflectance on the surface of the low reflectance unit 24 may not necessarily be uniform, and reflectance may partially or locally be different, for example. That is to say, a case where an average value of light reflectance on the surface of the low reflectance unit 24 is lower than light reflectance on the inner wall surface 21si of the integrating sphere 21 is considered, for example.

In the present embodiment, the internal space Si0, which is approximately spherical, of the integrating sphere 21 and a space (also referred to as an external space) So0 located external to the internal space Si0 are connected by the aperture H2 for receiving light. A portion forming the external space So0 along with the light receiving unit 23 forms the low reflectance unit 24, for example.

Due to the presence of the low reflectance unit 24, the aperture H2 for receiving light herein functions as a so-called light trap that contributes to reduction in component of the specularly reflected light of the reflected light from the sample 4 entering the detecting unit 23b, for example. Japanese Industrial Standards (JIS) Z8722:2009 "Methods of color measurement-Reflecting and transmitting objects" specifies that "it is desirable that a light trap used in a case where a component of mirror reflection is excluded exclude at least 95% of specularly reflected light from a smooth mirror surface". Thus, if light reflectance of the low reflectance unit 24 is equal to or lower than 5%, the low reflectance unit 24 can sufficiently function as the so-called light trap.

If the aperture H2 for receiving light has an appropriate size and is disposed appropriately, for example, the low reflectance unit 24 is set to have an appropriate size, and the component of the specularly reflected light produced on the surface in the two-dimensional area Am1 is less likely to be mixed into the reflected light directed from the two-dimensional area Am1 to the light receiving unit 23. The component of the specularly reflected light produced on the surface of the sample 4 of the reflected light produced on the surface of the sample 4 and entering the detecting unit 23b from the surface of the sample 4 can thus be reduced by adjusting the size and the disposition of the aperture H2 for receiving light provided to the integrating sphere 21, for example. The size and the disposition of the low reflectance unit 24 will be further described below.

(1-3) Control Unit

Figure 4:
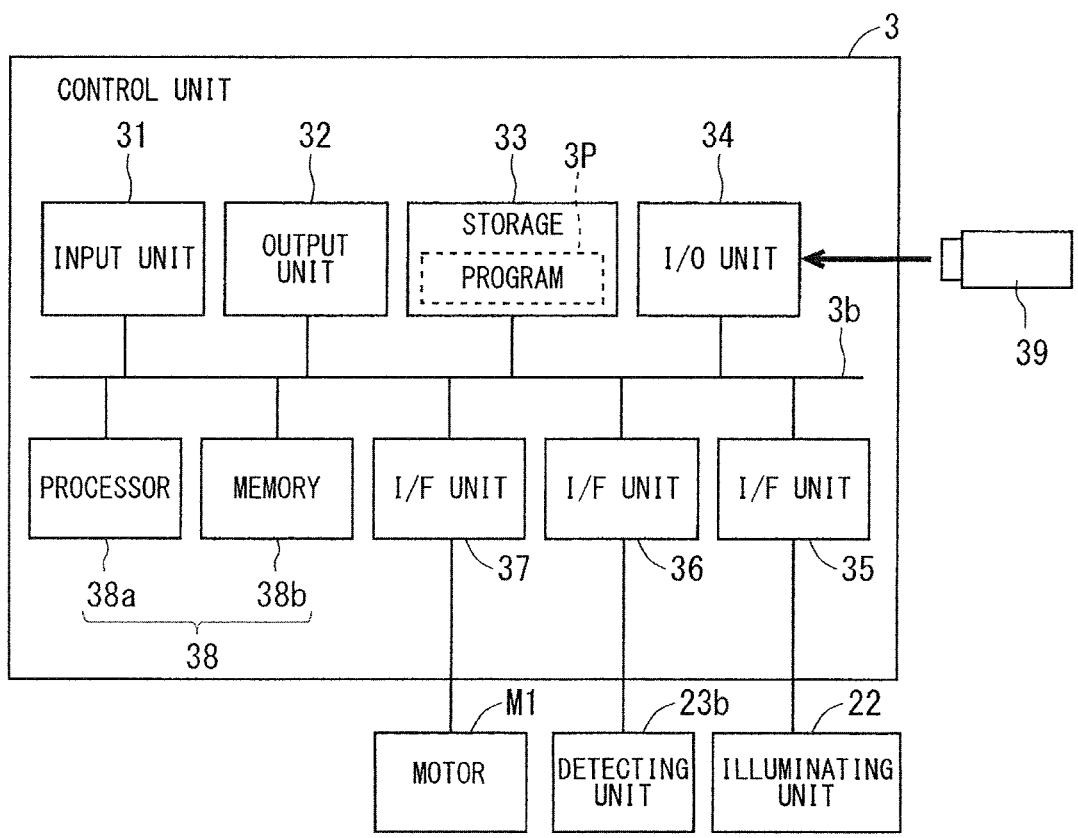
FIG. 4 is a block diagram showing an example of the configuration of a control unit.

FIG. 4 is a block diagram showing an example of the configuration of the control unit 3.

The control unit 3 includes an input unit 31, an output unit 32, a storage 33, an input/output (I/O) unit 34, interface (I/F) units 35, 36, and 37, and a controller 38, and these units are connected to be able to transmit and receive data through a bus 3b.

The input unit 31 can receive, as an input, a signal in response to operation of a user, for example. Examples of the input unit 31 can include an operation unit that receives, as an input, a signal in response to operation of the user on various buttons and the like and a voice input unit that recognizes, in response to a voice of the user, the voice, and receives a signal as an input.

The output unit 32 can output various pieces of information so that the user can recognize the pieces of information, for example. Examples of the output unit 32 can include a display device or a projector that outputs various pieces of information so that the user can view the pieces of information and a speaker that outputs various pieces of information so that the user can hear a difference between the pieces of information.

The storage 33 can store a program 3P, various pieces of information, and the like, for example. An example of the storage 33 can include a nonvolatile storage medium, such as ROM.

The I/O unit 34 can receive a storage medium 39, and provide and receive data between the storage medium 39 and the controller 38. Examples of the I/O unit 34 can include a USB port and a card reader. Examples of the storage medium 39 can include flash memory and an SD memory card.

The I/F units 35, 36, and 37 can transmit and receive various signals and various pieces of data to and from portions other than the control unit 3 through a communication line, a cable, or the like. An example in which the I/F unit 35 is connected to the illuminating unit 22, the I/F unit 36 is connected to the detecting unit 23b, and the I/F unit 37 is connected to the motor portion M1 is shown herein.

The controller 38 is an electrical circuit including a processor 38a, memory 38b, and the like. For example, a central processing unit (CPU) and the like can herein be used as the processor 38a, and random access memory (RAM), which is volatile memory, and the like can herein be used as the memory 38b. The controller 38 reads and executes the program 3P stored in the storage 33 to achieve various functions, various types of information processing, and the like in cooperation with the program 3P stored in the storage 33. Operation of each unit of the control unit 3 and various types of processing in the control unit 3 are thereby controlled. Data temporarily generated in the various types of information processing can herein be stored appropriately in the memory 38b and the like. Various functional structures achieved by the controller 38 may be achieved by hardware, such as a dedicated electronic circuit, for example.

The controller 38 can control rotation of the motor portion M1, for example. The type of the filter portion F1 disposed between the lens unit 23a1 and the detecting unit 23b can thus be switched, for example.

Specifically, any one of the filter portions F1x, F1y, and F1z for the tristimulus values X, Y, and Z is disposed between the lens unit 23a1 and the detecting unit 23b, for example. In this case, the detecting unit 23b can output a signal relating to each of wavelength ranges of the tristimulus values X, Y, and Z. In this case, when the filter portion F1x for the tristimulus value X is disposed between the lens unit 23a1 and the detecting unit 23b, for example, the detecting unit 23b can output a signal relating to a wavelength range of the tristimulus value X. When the filter portion F1y for the tristimulus value Y is disposed between the lens unit 23a1 and the detecting unit 23b, the detecting unit 23b can output a signal relating to a wavelength range of the tristimulus value Y. When the filter portion F1z for the tristimulus value Z is disposed between the lens unit 23a1 and the detecting unit 23b, the detecting unit 23b can output a signal relating to a wavelength range of the tristimulus value Z.

The controller 38 can also control light irradiation, by the illuminating unit 22, of the inner wall surface 21si of the integrating sphere 21, for example. Light emission of the light source unit 22b is herein controlled through the light-emitting circuit 22a.

The controller 38 can acquire two-dimensional distribution of the surface color in the two-dimensional area Am1 of the sample 4 based on the signal output from the detecting unit 23b, for example. For example, image data showing the two-dimensional distribution of the surface color in the two-dimensional area Am1 can be acquired for a wavelength range of light relating to each of the tristimulus values X, Y, and Z. The two-dimensional distribution of the surface color can herein be acquired after the signal output from the detecting unit 23b is corrected with respect to linearity relating to an output of the sensor of the detecting unit 23b, for example. The two-dimensional distribution of the surface color acquired by the controller 38 is appropriately corrected as necessary. The image data showing the two-dimensional distribution of the surface color in the two-dimensional area Am1 of the sample 4 acquired by the controller 38 can be stored appropriately in the storage 33.

An area of the detecting unit 23b including all the plurality of photoelectric conversion elements arranged two-dimensionally or an area of the detecting unit 23b exclusive of photoelectric conversion elements close to an outside edge portion of the plurality of photoelectric conversion elements is an area (also referred to as an effective area) corresponding to the two-dimensional distribution of the surface color in the two-dimensional area Am1, for example.

(1-4) Disposition of Low Reflectance Unit

Figure 5:
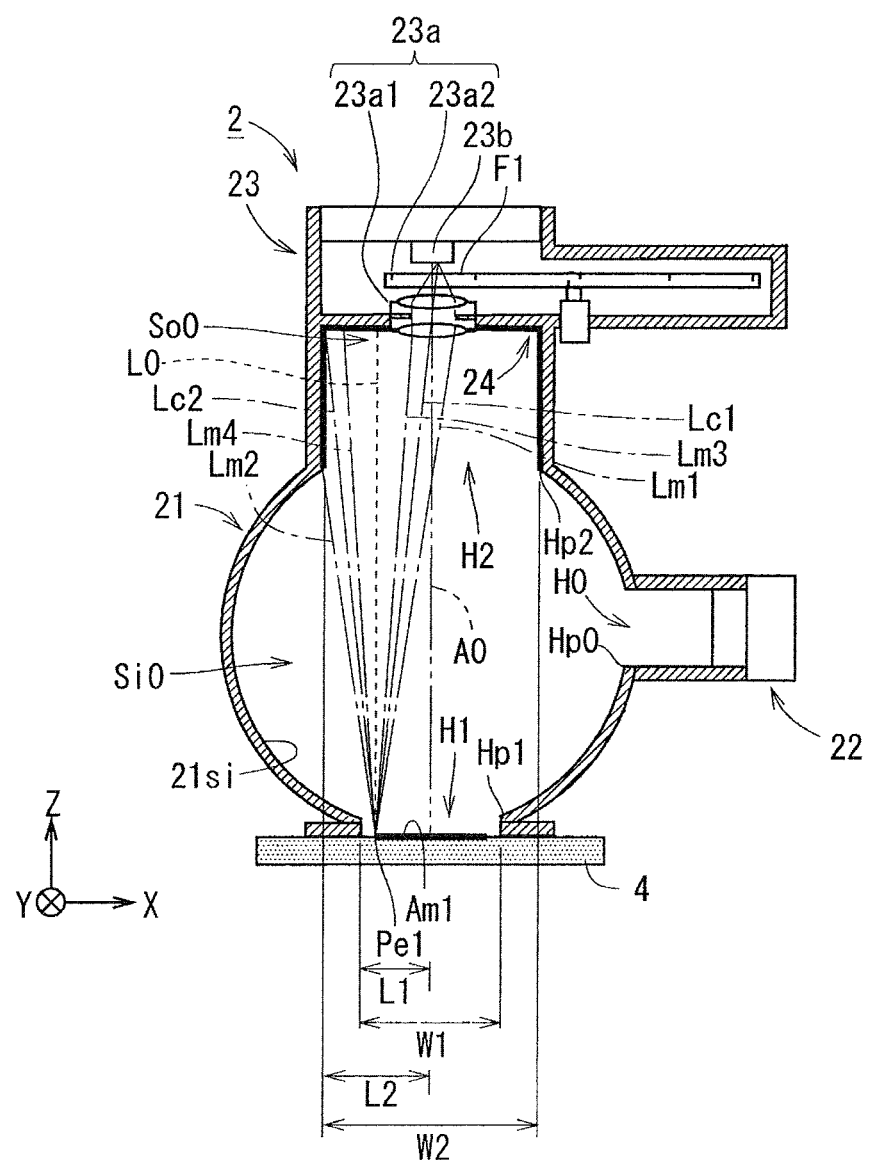
FIG. 5 illustrates schematic configuration of a colorimetric unit according to the embodiment.

FIG. 5 illustrates schematic configuration of the colorimetric unit 2 according to the embodiment. FIG. 5 focuses on the colorimetric unit 2 of FIG. 1. In FIG. 5, the two-dimensional area Am1 is indicated by the thick line as in FIG. 1.

As shown in FIG. 5, an outside diameter W2 of the low reflectance unit 24 in plan view of the low reflectance unit 24 from the aperture H1 for measurement is set to be greater than a diameter W1 of the aperture H1 for measurement in plan view of the aperture H1 for measurement from the aperture H2 for receiving light, for example. The component of the specularly reflected light of the reflected light produced on the surface of the sample 4 and entering the detecting unit 23b from the surface of the sample 4 can thus be reduced by the presence of the low reflectance unit 24.

In other words, the aperture H2 for receiving light also functions as the so-called light trap that contributes to reduction in component of the specularly reflected light of the reflected light from the sample 4 entering the detecting unit 23b, for example. The two-dimensional distribution of the surface color in the two-dimensional area Am1 of the sample 4 acquired by the controller 38 based on the signal output from the detecting unit 23b is thus less likely to be affected by a reflection of the inner wall surface 21si of the integrating sphere 21, for example. In this case, the number of apertures provided to the integrating sphere 21 and the area occupied by the apertures can be reduced compared with configuration in which an aperture for the so-called light trap is provided to the integrating sphere 21 separately from the aperture H2 for receiving light, for example. As a result, reduction in function of the integrating sphere 21 can be suppressed, and a color on the surface of the sample 4 can be measured with high accuracy.

Assume herein that the center of the aperture H1 for measurement and the center of the aperture H2 for receiving light are disposed on the optical axis A0 of the optical system 23a, for example. In this case, a distance L2 from the optical axis A0 of the optical system 23a to an outside edge portion of an area in which the low reflectance unit 24 exists in a direction orthogonal to the optical axis A0 is set to be greater than a distance L1 from the optical axis A0 to an end edge portion of the aperture H1 for measurement in the direction, for example. FIG. 5 shows an example in which a -X direction is used as the direction.

Assume herein that an optical path Lc1 denotes a linear optical path of a principal ray, of the reflected light from the two-dimensional area Am1, passing through the center of the optical system 23a from an outside edge portion Pe1 of the two-dimensional area Am1 to the detecting unit 23b, and a straight line Lc2 denotes a straight line having a line symmetric relationship with the optical path Lc1 of the principal ray with respect to a normal L0 to the surface of the sample 4 at the outside edge portion Pe1, for example. The principal ray is a ray passing through the center of a diaphragm of the optical system 23a, for example.

In this case, when the low reflectance unit 24 is located to cross the straight line Lc2 as shown in FIG. 5, for example, the component of the specularly reflected light of the reflected light from the sample 4 entering the detecting unit 23b can be reduced by approximately a half. The component of the specularly reflected light is thus less likely to be mixed into the reflected light from the sample 4 entering the detecting unit 23b while reduction in function of the integrating sphere 21 for achieving diffuse illumination is suppressed. As a result, reduction in function of the integrating sphere 21 can further be suppressed, and the color on the surface of the sample 4 can be measured with higher accuracy. The optical path Lc1 and the straight line Lc2 are indicated by alternate long and short dash lines in FIG. 5. FIG. 5 shows an example in which the low reflectance unit 24 is disposed from a portion around the optical system 23a to the location at which the low reflectance unit 24 crosses the straight line Lc2.

Assume further herein that an optical path Lm1 denotes a linear optical path of a ray, of the reflected light from the two-dimensional area Am1, crossing the optical axis A0 of the optical system 23a and passing through the optical system 23a from the outside edge portion Pe1 of the two-dimensional area Am1 to an end portion of the effective area of the detecting unit 23b, and a straight line Lm2 denotes a straight line having a line symmetric relationship with the optical path Lm1 with respect to the normal L0 to the surface of the sample 4 at the outside edge portion Pe1, for example.

In this case, when the low reflectance unit 24 is located to cross the straight line Lm2 as shown in FIG. 5, for example, almost no component of the specularly reflected light is included in the reflected light from the sample 4 entering the detecting unit 23b. The component of the specularly reflected light of the reflected light produced on the surface of the sample 4 and entering the effective area of the detecting unit 23b from the surface of the sample 4 can thus be reduced significantly. As a result, reduction in function of the integrating sphere 21 can be suppressed significantly, and the accuracy of measurement of the color on the surface of the sample 4 can be improved significantly. In a case where light passing through an end portion of an entrance pupil of the reflected light from the outside edge portion Pe1 of the two-dimensional area Am1 is herein applied to the end portion of the effective area of the detecting unit 23b, for example, the optical path Lm1 is an optical path of a marginal ray. The optical path Lm1 and the straight line Lm2 are indicated by alternate long and short dash lines in FIG. 5. FIG. 5 shows an example in which the low reflectance unit 24 is disposed from the portion around the optical system 23a to the location at which the low reflectance unit 24 crosses the straight line Lm2.

Assume herein that the centers of the two apertures H1 and H2 are disposed on the optical axis A0, the two apertures H1 and H2 are circular, the inside diameter of the integrating sphere 21 is set to 100 mm, a distance (WD) between the optical system 23a and the sample 4 is set to 136 mm, a focal length (fl) of the optical system 23a is set to 15 mm, and the F-number of the optical system 23a is set to 4.0, for example. In this case, when the diameter of the aperture H1 for measurement is set to 40 mm, and the diameter of the two-dimensional area Am1 is set to 35 mm, the low reflectance unit 24 can be located to cross the straight line Lm2 if the diameter of the aperture H2 for receiving light is set to approximately 60 mm. That is to say, the function as the so-called light trap can be achieved, for example, if the diameter of the aperture H2 for receiving light is set to approximately 60 mm.

The detecting unit 23b can image the two-dimensional area Am1 if the diameter of the aperture H2 for receiving light is set to approximately 20 mm. The area of the aperture having a diameter of approximately 60 mm is herein approximately nine times the area of the aperture having a diameter of approximately 20 mm Compared with a case where the aperture for the so-called light trap and the aperture for receiving light are provided separately, the area relating to the two apertures can thus be reduced by approximately 10% when the two apertures are provided collectively as one aperture. As a result, reduction in function of the integrating sphere 21 can be suppressed.

(1-5) Summary of Embodiment

As described above, in the colorimetric device 1 according to the present embodiment, the low reflectance unit 24 is disposed around the light receiving unit 23 to face the internal space Si0 of the integrating sphere 21. The low reflectance unit 24 has lower light reflectance than the inner wall surface 21si of the integrating sphere 21. Due to the presence of the low reflectance unit 24 having such configuration, the specularly reflected light produced in the two-dimensional area Am1 is less likely to enter the light receiving unit 23. That is to say, the component of the specularly reflected light produced in the two-dimensional area Am1 of light entering the detecting unit 23b from the two-dimensional area Am1 through the optical system 23a can be reduced. A compact colorimetric device 1 that can measure the color on the surface of the sample 4 with high accuracy can thus be provided.

(2) Modifications

The present invention is not limited to the above-mentioned embodiment, and various modifications, improvements, and the like can be made without departing from the scope of the present invention.

(2-1) First Modification

In the above-mentioned embodiment, the portion forming the external space So0 located external, from the aperture H2 for receiving light, to the internal space Si0 of the integrating sphere 21 forms the low reflectance unit 24, but the low reflectance unit 24 is not limited to that in this example. For example, the low reflectance unit may form a part of the inner wall surface of the integrating sphere 21 around the aperture for receiving light. With such configuration, the component of the specularly reflected light produced on the surface of the sample 4 of the reflected light produced on the surface of the sample 4 and entering the detecting unit 23b from the surface of the sample 4 can be reduced by adjusting the size and the disposition of the low reflectance unit provided around the aperture for receiving light provided to the integrating sphere, for example.

Figure 6:
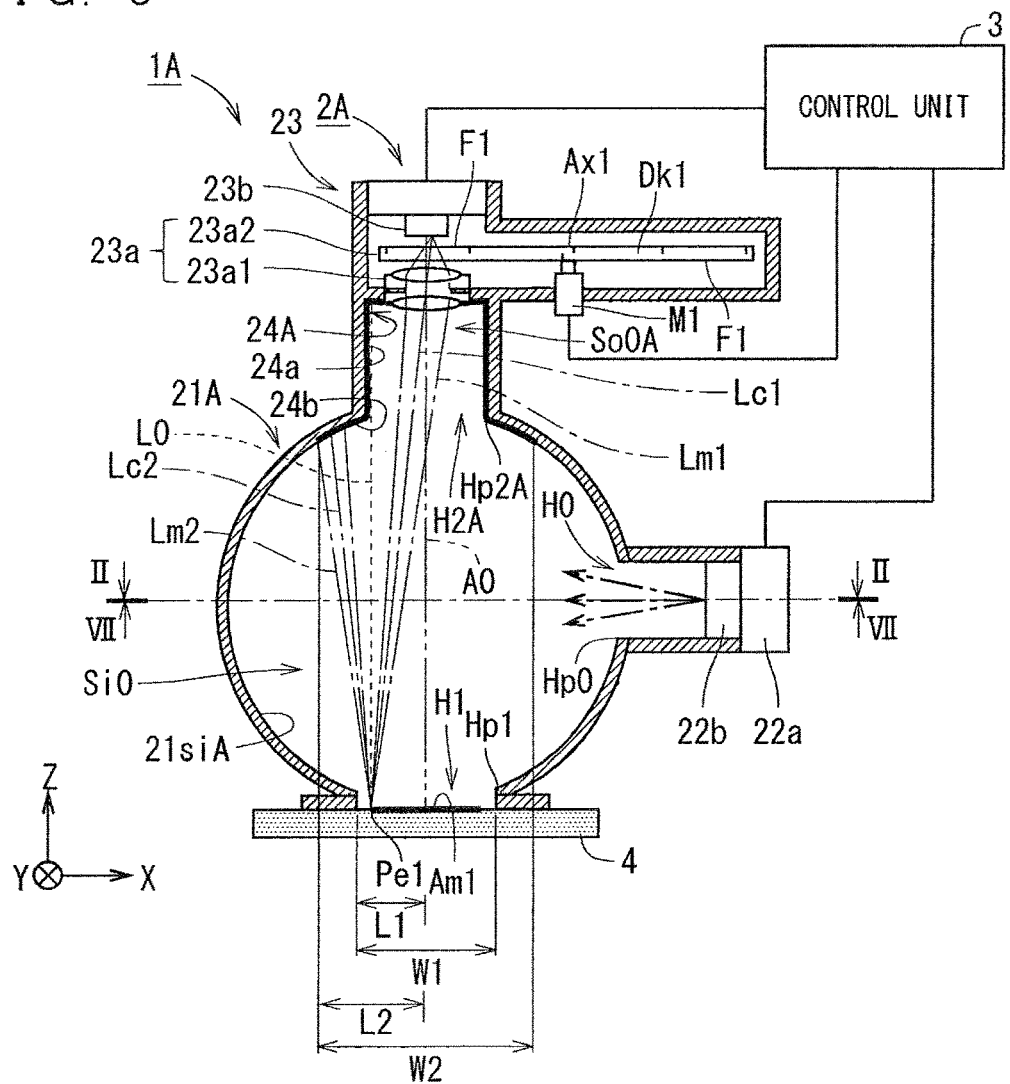
FIG. 6 illustrates schematic configuration of a colorimetric device according to a first modification.
Figure 7:
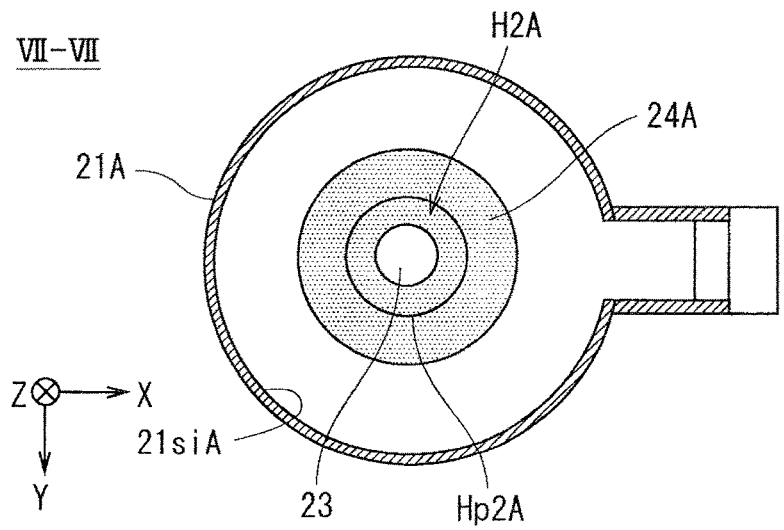
FIG. 7 illustrates the top of an integrating sphere according to the first modification as viewed from the inside thereof.

Description will be made herein by taking a specific example in which such configuration is used. FIG. 6 illustrates schematic configuration of the colorimetric device 1A according to a first modification. FIG. 7 illustrates the top of an integrating sphere according to the first modification as viewed from the inside thereof. Specifically, FIG. 7 shows an XY cross section taken along an alternate long and short dash line VII-VII of FIG. 6. In FIG. 6, a low reflectance unit 24A is indicated by a thick line, and the optical path Lc1, the straight line Lc2, the optical path Lm1, and the straight line Lm2 are indicated by thin alternate long and short dash lines. In FIG. 7, the low reflectance unit 24A is shown with sand pattern hatching.

As shown in FIGS. 6 and 7, the colorimetric device 1A according to the first modification is based on the colorimetric device 1 according to the above-mentioned embodiment, and includes a colorimetric unit 2A including an integrating sphere 21A and the low reflectance unit 24A in place of the colorimetric unit 2 including the integrating sphere 21 and the low reflectance unit 24. The integrating sphere 21A is based on the integrating sphere 21 according to the above-mentioned embodiment, and has a second aperture portion Hp2A forming an aperture H2A for receiving light having a reduced diameter in place of the second aperture portion Hp2 forming the aperture H2 for receiving light and an inner wall surface 21siA in place of the inner wall surface 21si. The low reflectance unit 24A is based on the low reflectance unit 24 according to the above-mentioned embodiment, and includes not only a portion forming an external space So0A but also a part of the inner wall surface 21siA of the integrating sphere 21A located around the aperture H2A for receiving light. The external space So0A is herein located external, from the aperture H2A for receiving light, to the internal space Si0 of the integrating sphere 21.

As described above, in the present modification, the low reflectance unit 24A may form a part 24b of the inner wall surface 21si of the integrating sphere 21A around the aperture H2A for receiving light. With such configuration, the component of the specularly reflected light produced on the surface of the sample 4 of the reflected light produced on the surface of the sample 4 and entering the detecting unit 23b from the surface of the sample 4 can be reduced by adjusting the size and the disposition of the low reflectance unit 24A provided around the aperture H2A for receiving light provided to the integrating sphere 21A, for example.

In the present modification, the low reflectance unit 24A includes a portion 24a that forms the external space So0A connected to the internal space Si0 at the aperture H2A for receiving light and located external to the internal space Si0. The low reflectance unit 24A can herein be set to have an appropriate size if the aperture H2A for receiving light has an appropriate size and is disposed appropriately, and the low reflectance unit 24a provided around the aperture H2A has an appropriate size and is disposed appropriately, for example. The component of the specularly reflected light produced on the surface in the two-dimensional area Am1 is thus less likely to be mixed into the reflected light directed from the two-dimensional area Am1 to the light receiving unit 23. As a result, the component of the specularly reflected light produced on the surface of the sample 4 of the reflected light produced on the surface of the sample 4 and entering the detecting unit 23b from the surface of the sample 4 can be reduced.

In FIGS. 6 and 7, the low reflectance unit 24A includes the part of the inner wall surface 21siA, which is spherical, of the integrating sphere 21A around the aperture H2A for receiving light, but the inner wall surface 21siA is not limited to that in this example. For example, around the aperture H2A for receiving light, the inner wall surface 21siA of the integrating sphere 21A may not be spherical, and may be tapered to be connected to the aperture H2A.

(2-2) Second Modification

In the above-mentioned embodiment and the above-mentioned first modification, description is made on an example in which a typical imaging lens is applied to the optical system 23a, but the optical system 23a is not limited to that in this example. For example, the optical system 23a may be replaced by an optical system 23aB including a telecentric lens.

Figure 8:
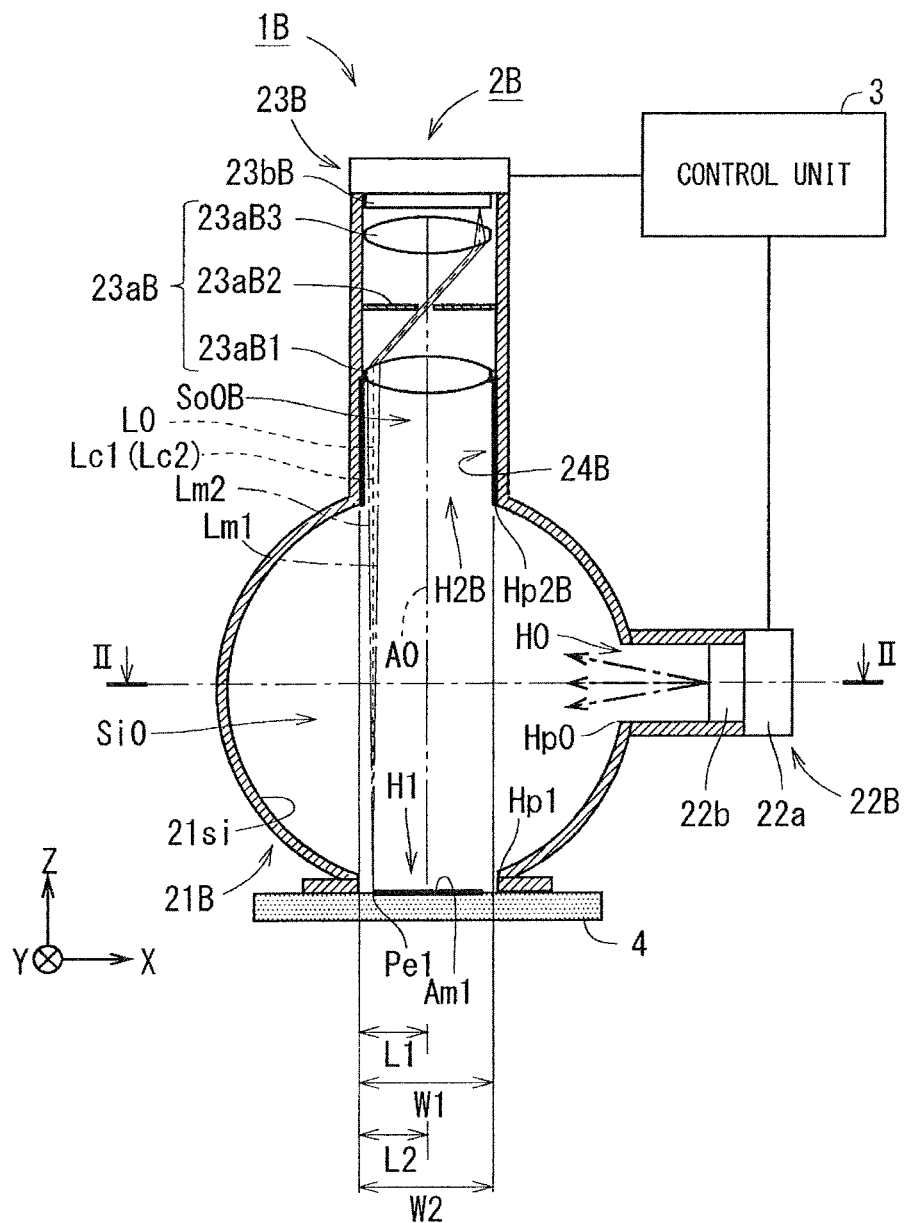
FIG. 8 illustrates schematic configuration of a colorimetric device according to a second modification.

Description will be made herein by taking a specific example in which such configuration is used. FIG. 8 illustrates schematic configuration of the colorimetric device 1B according to a second modification. In FIG. 8, a low reflectance unit 24B is indicated by a thick line, and the optical path Lc1 and the straight line Lc2 are indicated by a dashed line parallel to the optical axis A0, and the optical path Lm1 and the straight line Lm2 are indicated by alternate long and short dash lines.

As shown in FIG. 8, the colorimetric device 1B according to the second modification is based on the colorimetric device 1 according to the above-mentioned embodiment, and includes a colorimetric unit 2B in place of the colorimetric unit 2, for example. The colorimetric unit 2B is based on the colorimetric unit 2 according to the above-mentioned embodiment, and includes an integrating sphere 21B, a light receiving unit 23B, and the low reflectance unit 24B in place of the integrating sphere 21, the light receiving unit 23, and the low reflectance unit 24. The integrating sphere 21B is based on the integrating sphere 21 according to the above-mentioned embodiment, and has a second aperture portion Hp2B forming an aperture H2B for receiving light having a reduced diameter in place of the second aperture portion Hp2 forming the aperture H2 for receiving light. The light receiving unit 23B is based on the light receiving unit 23 according to the above-mentioned embodiment, and includes the optical system 23aB to which a so-called bi-telecentric lens is applied in place of the optical system 23a and a detecting unit 23bB having an effective area having approximately the same shape as the two-dimensional area Am1 in place of the detecting unit 23b.

The optical system 23aB is a lens unit in which a first lens portion 23aB1, a diaphragm portion 23aB2, and a second lens portion 23aB3 are arranged in this order. The detecting unit 23bB according to the present modification is formed, for example, by a color area sensor.

The low reflectance unit 24B forms, along with the light receiving unit 23B, an external space So0B connected to the internal space Si0, which is approximately spherical, of the integrating sphere 21B by the aperture H2B for receiving light, and located external to the internal space Si0.

The so-called bi-telecentric lens is herein applied to the optical system 23aB, and the optical path Lc1 of the principal ray relating to the outside edge portion Pe1 is approximately parallel to the optical axis A0. The optical path Lc1 of the principal ray thus approximately matches the normal L0 to the surface of the sample 4 at the outside edge portion Pe1 of the two-dimensional area Am1, for example. The optical path Lc1 of the principal ray also approximately matches the straight line Lc2 relating to the principal ray, for example.

Furthermore, the diaphragm 23aB2 of the telecentric lens is narrow, for example, and thus an angle formed by the optical path Lc1 and straight line Lc2 with respect to the normal L0 can be much narrower than that in the above-mentioned embodiment. An area in which the low reflectance unit 24B is disposed may thus be narrow, for example. The diameter of the aperture H2B for receiving light can thus greatly be reduced compared with the diameter of the aperture H2 for receiving light according to the above-mentioned embodiment, for example. The color on the surface of the sample 4 can thus be measured with high accuracy while reduction in function of the integrating sphere 21B is suppressed, for example.

In this case, as shown in FIG. 8, the outside diameter W2 of the low reflectance unit 24B in plan view of the low reflectance unit 24B from the aperture H1 for measurement is approximately the same as the diameter W1 of the aperture H1 for measurement in plan view of the aperture H1 for measurement from the aperture H2B for receiving light, for example. Also with the use of such configuration, the component of the specularly reflected light produced on the surface in the two-dimensional area Am1 is less likely to be mixed into the reflected light directed from the two-dimensional area Am1 to the light receiving unit 23B, for example. As a result, the component of the specularly reflected light produced on the surface of the sample 4 of the reflected light produced on the surface of the sample 4 and entering the detecting unit 23bB from the surface of the sample 4 can be reduced. That is to say, when the outside diameter W2 of the low reflectance unit 24B in plan view of the low reflectance unit 24B from the aperture H1 for measurement is equal to or greater than the diameter W1 of the aperture H1 for measurement in plan view of the aperture H1 for measurement from the aperture H2B for receiving light, for example, the aperture H2B for receiving light also functions as the so-called light trap that contributes to reduction in component of the specularly reflected light of the reflected light from the sample 4 entering the detecting unit 23bB.

As in the above-mentioned embodiment, assume herein that the centers of the two apertures H1 and H2 are disposed on the optical axis A0, the two apertures H1 and H2 are circular, the inside diameter of the integrating sphere 21 is set to 100 mm, the distance (WD) between the optical system 23a and the sample 4 is set to 136 mm, the focal length (fl) of the optical system 23a is set to 15 mm, and the F-number of the optical system 23a is set to 4.0, for example. In this case, the detecting unit 23b can image the two-dimensional area Am1 if the diameter of the aperture H2 for receiving light is set to approximately 20 mm. The function as the so-called light trap can herein be achieved, for example, if the diameter W1 of the aperture H1 for measurement and the diameter W2 of the aperture H2B for receiving light are approximately the same, and the diameter W2 of the aperture H2B for receiving light is set to approximately 40 mm, for example.

If the diameter of the aperture H2B for receiving light is set to approximately 20 mm, the area of the aperture having a diameter of approximately 40 mm is herein approximately four times the area of the aperture having a diameter of approximately 20 mm Compared with the case where the aperture for the so-called light trap and the aperture for receiving light are provided separately, the area relating to the two apertures can be reduced by approximately 20% when the two apertures are provided collectively as one aperture as in the present modification. The number of apertures provided to the integrating sphere 21B and the area occupied by the apertures can thus be reduced compared with configuration in which the aperture for the so-called light trap is provided to the integrating sphere 21B separately from the aperture H2B for receiving light. As a result, the color on the surface of the sample 4 can be measured with high accuracy while reduction in function of the integrating sphere 21B is suppressed.

Description is made herein by taking an example in which the so-called bi-telecentric lens is used as the optical system 23aB, but the optical system 23aB is not limited to that in this example, and a so-called object side telecentric lens that causes the optical axis A0 and the optical path Lc1 of the principal ray to be approximately parallel to each other at the side of the sample 4 (i.e., at an object side) may be used, for example.

(2-3) Other Modifications

In the above-mentioned embodiment and the above-mentioned first modification, the wavelength range of light received by the detecting unit 23b is adjusted by the filter unit 23a2, and thus the detecting unit 23b is formed by the monochrome area sensor and the like, for example, but the detecting unit 23b is not limited to that in this example. For example, the detecting unit 23b may be formed by the color area sensor and the like, for example, instead of providing the filter unit 23a2.

In the above-mentioned second modification, the detecting unit 23bB is formed by the color area sensor and the like, but the detecting unit 23bB is not limited to that in this example. For example, as in the above-mentioned embodiment and the above-mentioned first modification, the detecting unit 23bB may be formed by the monochrome area sensor and the like by providing the filter unit 23a2.

In the above-mentioned embodiment and the above-mentioned various modifications, the controller 38 can acquire the two-dimensional distribution of the surface color in the two-dimensional area Am1 of the sample 4 based on the signal output from the detecting unit 23b or 23bB, for example, but the controller 38 is not limited to that in this example. For example, the controller 38 may acquire a representative value of the color in the two-dimensional area Am1 having various shapes in accordance with the output from the detecting unit 23b or 23bB. The various shapes can herein include not only a circular shape but also various shapes such as a star shape and a linear shape, for example. The representative value of the color can herein include various statistical values such as an average value, an intermediate value, and a mode value of the color, for example.

In the above-mentioned embodiment and the above-mentioned various modifications, the optical axis A0 of the lens unit 23a1 or the optical system 23aB passes through the centers of the aperture H1 for measurement and the aperture H2 for receiving light, but the aperture H1 for measurement and the aperture H2 for receiving light are not limited to those in this example. That is to say, the aperture H1 for measurement and the aperture H2 for receiving light may not completely oppose each other. For example, a normal to the aperture H1 for measurement passing through the center of the aperture H1 and a normal to the aperture H2 for receiving light passing through the center of the aperture H2 may slightly deviate from each other or may have a slightly inclined relationship. For example, the aperture H1 for measurement and the aperture H2 for receiving light are only required to have an area in which they oppose each other to some extent. However, as the normal to the aperture H1 for measurement passing through the center of the aperture H1 and the normal to the aperture H2 for receiving light passing through the center of the aperture H2 approach each other, or an inclination angle between them decreases, the component of the specularly reflected light produced on the surface of the sample 4 of the reflected light produced on the surface of the sample 4 and entering the detecting unit 23b or 23bB from the surface of the sample 4 can be reduced while reduction in function of the integrating sphere 21, 21A, or 21B due to an increase in size of the aperture H2 for receiving light is suppressed.

Figure 9:
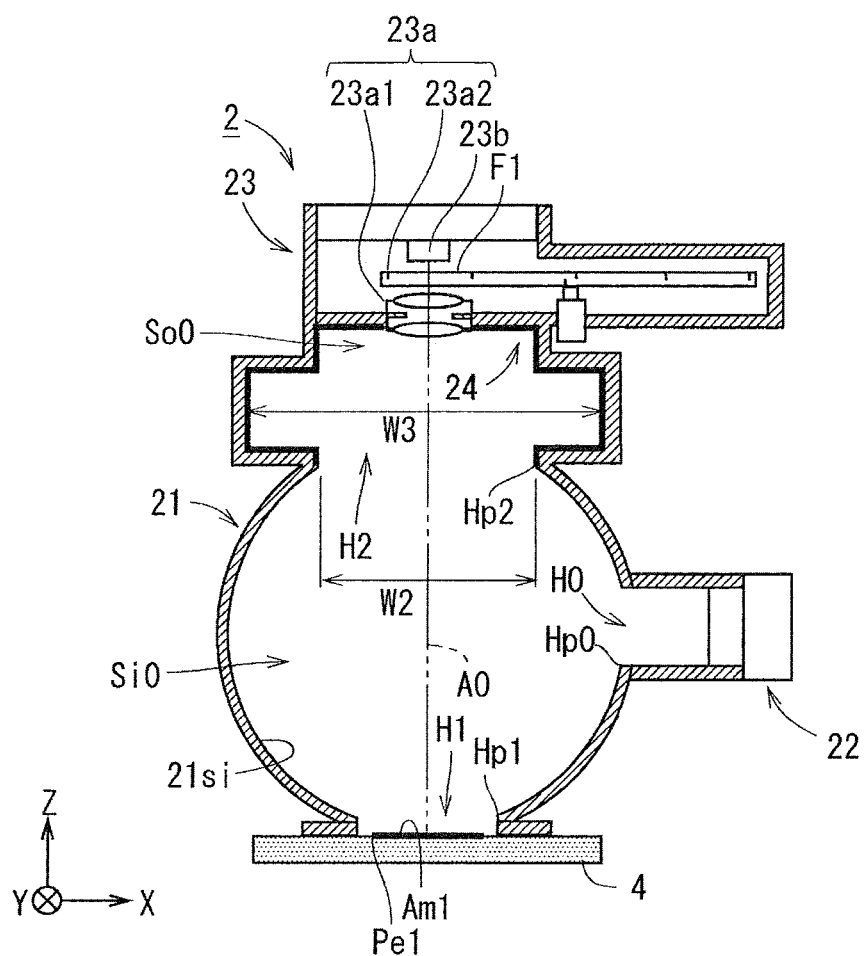
FIG. 9 illustrates schematic configuration of a colorimetric unit according to another modification.

In the above-mentioned embodiment and the above-mentioned various modifications, description is made by taking an example in which the diameter of the external space So0, So0A, or So0B is approximately constant, but the diameter is not limited to that in this example. For example, as shown in FIG. 9, a diameter W3 of the external space So0, which is connected to the aperture H2 for receiving light formed by the second aperture portion Hp2, in cross section orthogonal to the normal to the aperture H2 for receiving light may be set to be greater than the diameter W2 of the aperture H2 for receiving light. Exit, to the internal space Si0, of stray light having entered the external space So0 from the internal space Si0 can thus be suppressed, for example. Light reflectance of the low reflectance unit 24 can thus further be reduced.

It goes without saying that all or part of the above-mentioned embodiment and various modifications can be combined with each other appropriately unless any contradiction occurs.

(2-4) Others

The present invention includes colorimetric devices according to the following second to seventh aspects, for example.

The colorimetric device according to the second aspect is the colorimetric device according to the above-mentioned first aspect in which the low reflectance unit includes a portion that forms an external space connected to the internal space at the aperture for receiving light, and located external to the internal space.

According to the colorimetric device according to the second aspect, the component of the specularly reflected light produced on the surface of the sample of the reflected light produced on the surface of the sample and entering the detecting unit from the surface of the sample can be reduced by adjusting the size and the disposition of the aperture for receiving light provided to the integrating sphere, for example.

The colorimetric device according to the third aspect is the colorimetric device according to the above-mentioned second aspect in which a diameter of the external space in cross section orthogonal to a normal to the aperture for receiving light is greater than a diameter of the aperture for receiving light.

According to the colorimetric device according to the third aspect, exit, to the internal space, of stray light having entered the external space can be suppressed, and thus light reflectance of the low reflectance unit can further be reduced.

The colorimetric device according to the fourth aspect is the colorimetric device according to any one of the above-mentioned first to third aspects in which the low reflectance unit forms a part of the inner wall surface around the aperture for receiving light.

According to the colorimetric device according to the fourth aspect, the component of the specularly reflected light produced on the surface of the sample of the reflected light produced on the surface of the sample and entering the detecting unit from the surface of the sample can be reduced by adjusting the size and the disposition of the low reflectance unit provided around the aperture for receiving light provided to the integrating sphere, for example.

The colorimetric device according to the fifth aspect is the colorimetric device according to any one of the above-mentioned first to fourth aspects in which the low reflectance unit includes a black portion.

According to the colorimetric device according to the fifth aspect, the low reflectance unit can easily be formed.

The colorimetric device according to the sixth aspect is the colorimetric device according to any one of the above-mentioned first to fifth aspects in which the low reflectance unit is located to cross a straight line having a line symmetric relationship, with respect to a normal to the surface of the sample at an outside edge portion of the two-dimensional area, with an optical path of a principal ray, of the reflected light, passing through a center of the optical system from the outside edge portion to the detecting unit.

According to the colorimetric device according to the sixth aspect, reduction in function of the integrating sphere for achieving diffuse illumination can be suppressed.

The colorimetric device according to the seventh aspect is the colorimetric device according to any one of the above-mentioned first to fifth aspects in which the low reflectance unit is located to cross a straight line having a line symmetric relationship, with respect to a normal to the surface of the sample at an outside edge portion of the two-dimensional area, with an optical path, of the reflected light, crossing an optical axis of the optical system and passing through the optical system from the outside edge portion to an end portion of an effective area of the detecting unit.

According to the colorimetric device according to the seventh aspect, the component of the specularly reflected light of the reflected light produced on the surface of the sample and entering the effective area of the detecting unit from the surface of the sample can be reduced significantly.

EXPLANATION OF REFERENCE SIGNS 1, 1A, 1B colorimetric device
2, 2A, 2B colorimetric unit
3 control unit
4 sample
21, 21A, 21B integrating sphere
21si, 21siA inner wall surface
22 illuminating unit
22b light source unit
23, 23B light receiving unit
23a, 23aB optical system
23a1 lens unit
23a2 filter unit
23b, 23bB detecting unit
24, 24A, 24B low reflectance unit
A0 optical axis
Am1 two-dimensional area
H0, H1, H2, H2A, H2B aperture
Hp1 first aperture portion
Hp2, Hp2A, Hp2B second aperture portion
L0 normal
Lc1, Lm1 optical path
Lc2, Lm2 straight line
Pe1 outside edge portion
Si0 internal space
So0, So0A, So0B external space

The invention claimed is:
1. A colorimetric device comprising:
an integrating sphere having a first aperture portion and a second aperture portion, said first aperture portion forming an aperture for measurement at which a sample is disposed to cover said aperture for measurement, said second aperture portion opposing said first aperture portion and forming an aperture for receiving light configured to allow reflected light from said sample to pass therethrough;
a light source unit irradiating an inner wall surface of said integrating sphere with light;
a light receiving unit receiving, through said aperture for receiving light, said reflected light from a two-dimensional area on a surface of said sample that enters said integrating sphere through said aperture for measurement when said light from said light source unit is reflected by said inner wall surface, and is applied to said two-dimensional area through said aperture for measurement, said light receiving unit including an optical system and a detecting unit configured to allow a signal in accordance with said reflected light guided by said optical system; and
a low reflectance unit disposed in an area around said light receiving unit to face an internal space of said integrating sphere, and having lower light reflectance than said inner wall surface of said integrating sphere, wherein
an outside diameter of said low reflectance unit in plan view of said low reflectance unit from said aperture for measurement is equal to or greater than a diameter of said aperture for measurement in plan view of said aperture for measurement from said aperture for receiving light, and wherein
said low reflectance unit is disposed in the path of specularly reflected light directed from said two-dimensional area.

2. The colorimetric device according to claim 1, wherein said low reflectance unit includes a portion that forms an external space connected to said internal space at said aperture for receiving light, and located external to said internal space.

3. The colorimetric device according to claim 2, wherein a diameter of said external space in cross section orthogonal to a normal to said aperture for receiving light is greater than a diameter of said aperture for receiving light.

4. The colorimetric device according to claim 1, wherein said low reflectance unit forms a part of said inner wall surface around said aperture for receiving light.

5. The colorimetric device according to claim 1, wherein said low reflectance unit includes a black portion.

6. The colorimetric device according to claim 1, wherein said low reflectance unit is located to cross a straight line having a line symmetric relationship, with respect to a normal to said surface of said sample at an outside edge portion of said two-dimensional area, with an optical path of a principal ray, of said reflected light, passing through a center of said optical system from said outside edge portion to said detecting unit.

7. The colorimetric device according to claim 1, wherein said low reflectance unit is located to cross a straight line having a line symmetric relationship, with respect to a normal to said surface of said sample at an outside edge portion of said two-dimensional area, with an optical path, of said reflected light, crossing an optical axis of said optical system and passing through said optical system from said outside edge portion to an end portion of an effective area of said detecting unit.

* * * * *